United States Patent [19]
Griesenbrock

[11] 3,831,786
[45] Aug. 27, 1974

[54] MATERIAL HANDLING APPARATUS
[75] Inventor: Karl-Heinz Griesenbrock, Duisburg, Germany
[73] Assignee: Eaton Corporation, Cleveland, Ohio
[22] Filed: Oct. 12, 1972
[21] Appl. No.: 297,108

[30] Foreign Application Priority Data
Oct. 19, 1971 Germany............................ 2151940

[52] U.S. Cl............ 214/16.4 A, 214/730, 104/243, 104/246, 105/26 R, 105/75, 105/215 G
[51] Int. Cl.............................................. B65g 1/10
[58] Field of Search................. 214/16.4 A, 16.4 B; 105/73, 75, 26, 26.1, 90 A, 159, 215 G; 104/170, 243; 188/41, 42

[56] References Cited
UNITED STATES PATENTS

| 1,342,761 | 6/1920 | Richardson ........................ 105/73 |
| 2,513,552 | 7/1950 | Dove.................... 105/159 |
| 2,810,458 | 10/1957 | Troxell............................ 188/170 |
| 3,086,618 | 4/1963 | Christiansen ...................... 214/620 |
| 3,330,384 | 7/1967 | Bertin et al. ......................... 188/42 |
| 3,695,463 | 10/1972 | Weisker......................... 214/16.4 A |

FOREIGN PATENTS OR APPLICATIONS
257,298 9/1964 Australia....................... 214/16.4 A Primary Examiner—Albert J. Makay
Assistant Examiner—Kenneth Noland
Attorney, Agent, or Firm—Teagno & Toddy

[57] ABSTRACT

A material handling apparatus comprising a rail supported and guided carriage, preferably including a shuttle assembly for narrow aisle operations, and a separate rubber tired, steerable drive vehicle. The carriage and drive vehicle are adapted to be coupled together with the steered wheel(s) of the drive vehicle lifted off the floor for in-aisle operation. An hydraulic press on the carriage applies a constant downward force on the drive wheels of the drive vehicle when the carriage and drive vehicle are coupled together, and a spring-loaded brake which is automatically released by operation of the hydraulic press acts against the aisle rails to hold the carriage in position for coupling and for safety purposes in case of hydraulic system failure.

11 Claims, 4 Drawing Figures

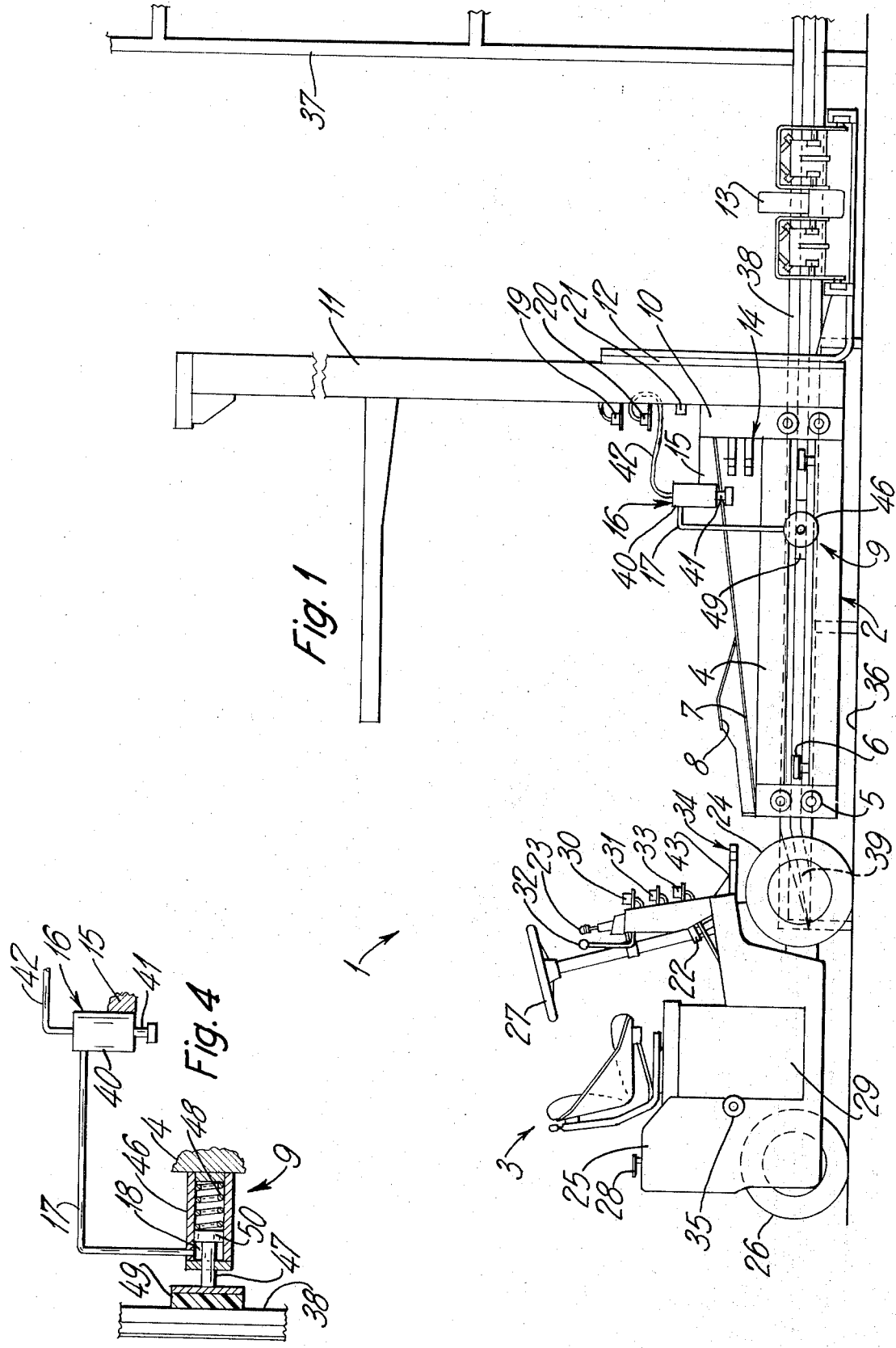

PATENTED AUG 27 1974

MATERIAL HANDLING APPARATUS

This invention relates to a material handling apparatus, and more particularly to a rubber-tired industrial vehicle positively guided by rails and having an upright assembly whose fork-carriage assembly is provided with a side loader.

Specialized vehicles for use in warehouses are generally of a type running on the floor that are rail-guided and independent of shelves or bins, or of a type that is permanently installed in a shelf aisleway. While large warehouses are preferably equipped with a permanently installed vehicle in every aisleway, small warehouses are, for reasons of economy, often outfitted with one relocatable vehicle for several or all aisleways. As a rule, the relocation of such vehicles is very expensive. On the other hand, it is true that rubber-tired units running on the floor and having a steering assembly of their own can be relocated in a simple manner, but, owing to their design features, they involve technical disadvantages impairing economical employment in narrow-aisle warehouse operations compared with permanently installed vehicles.

Permanently installed specialized stacker/retriever vehicles with integrated driving and control mechanisms can be quite economical where large handling capacities are required, in spite of their high initial cost. In many cases, however, varying handling capacities are required for the shelf aisleways of a storage installation, so that the expensive specialized units described above cannot always be utilized economically as far as capacity is concerned. Thus, either normal counterweight lift trucks with additional guiding means or analogously designed industrial trucks of simple construction with load-lifting devices and rubber tires running on the floor and positively guided within the shelf aisleways are used for storage installations with relatively low handling frequency. From the viewpoints of storage practice, economy, and safety the use of such units is unsatisfactory, as elucidated below in more detail.

One known type of warehousing vehicle employs the counterweight principle, having a telescoping multi-lift upright assembly and lateral castors with vertical axles guided by rails mounted on the floor, thus ensuring straight travel at proper distance to the shelves. In consideration of the tilting risk, this design of rail guide is limited as to permissible acceleration and braking especially with an elevated load. Another disadvantage is that both the castors and the steerable drive wheel sustain varying loads as a function of differing load weights, deflecting the upright assembly from its required perpendicular position relatively to the shelf line, and adversely affecting the driving and braking forces to be applied to the floor.

A further known counterweight lift truck, as shown by U.S. Pat. No. 3,549,025, features additional rail wheels on the hubs of its drive wheels and on a transverse axle fastened on the rear end of the truck, said rail wheels acting both as load carriers and as longitudinal guides by means of rails on the shelf aisleway when the normal lift truck wheels are completely relieved of load through which the undesirable load action on these wheels is concededly eliminated; however, the tilting risk is still involved as is the case with the abovementioned example. Also, the requirement for separate rail wheels adds expense and complication inconsistent with the needs of small warehouse operations.

Accordingly, a primary object of this invention is to provide a material handling apparatus particularly adapted for use in a small warehouse where a single load handling vehicle must be used in several load storage aisles.

Another object of the invention is to provide a material handling apparatus which is easily and safely movable from aisle to aisle by means of a separable power driven vehicle.

Another object of the invention is to provide a material handling apparatus which can be coupled to a power driven vehicle having independent use outside the storage aisles.

Another object of the invention is to provide a material handling vehicle as described above, in which variations in loading do not adversely affect driving and braking forces when the apparatus is operated in an aisle.

Another object of the invention is to provide a material handling vehicle as described above in which the steering function of the drive vehicle is fully operable outside a storage aisle, but which is automatically made inoperable in an aisle, guidance within the aisles being provided by tracks and guide rollers.

In order to meet the above objectives the present invention provides a material handling apparatus which includes a traveling carriage bearing an upright assembly with a side loader, said traveling carriage being guided by and supported on rails on the shelf aisleway by means of rollers and capable of being connected to a rubber-tired drive vehicle having a steering axle and a driving axle such that the steered wheels of said drive vehicle are lifted and its driving wheels are pressed against the floor with constant pressure. Even in case of different load weights, this design ensures constancy of transmission of preset driving and braking forces to the floor via elastic tires without the air-receiving means being deflected from alignment with the shelves through load variations. Moreover, the drive vehicle will remain completely free from supporting forces occasioned by load, since the traveling carriage is self-supporting, whereas the drive vehicles of the known constructions have to sustain considerable forces originating from load, so that they have to be dimensioned correspondingly for this purpose.

Furthermore, it can be recognized that, for the purpose of meeting varying storage requirements, the invention permits either to allot one drive vehicle to several traveling carriages remaining in the shelf aisleways or to relocate one material handling vehicle formed by a drive vehicle and a traveling carriage from aisleway to aisleway, since both coupling and uncoupling of drive vehicle and traveling carriage as well as relocation of the complete apparatus are extremely simple and require only little time, in particular if the other features hereinafter elucidated in more detail are employed.

A very simple embodiment is obtained, if the driving wheels are pressed against the floor with constant pressure from at least one vertically acting hydraulic press governed by constant pressure and arranged between traveling carriage and drive vehicle in the driving wheel area.

In addition to that, a particularly advantageous construction is attained if the traveling carriage has a frame that is open in the rear into which the drive vehicle, featuring an hydraulic system and control elements, can be passed with its front driving wheels remaining in driving engagement with the floor while its rear steered wheels are raised. By this means the driving wheels can be located approximately in the center of the entire unit, thus permitting proper maneuvering of the complete apparatus when relocated on cross aisleways.

Furthermore, the traveling carriage and drive vehicle can be provided with coacting mechanical coupling members, hydraulic coupling members for the lift cylinder of the upright assembly and the hydraulic press for depressing the driving wheels, as well as with control coupling members such that the entire unit can be operated from the operator's seat of the drive vehicle when operating in an aisle.

As a further development of the invention, the traveling carriage can be provided with hydraulically liftable spring-loaded rail brakes connected via lines to the hydraulic press depressing the driving wheels such that a friction grip will be established between the spring-loaded rail brakes and the rails if the pressure loading of this press is relieved intentionally or due to a defect. Through this, the traveling carriage is automatically secured in position for the drive vehicle to move in and out of, and in case of an hydraulic defect impairing the traction of the driven and braked wheels, there will be automatic emergency braking.

As the rail brake system is entirely independent of the drive vehicle service brake, an intentionally initiated emergency braking on the rails can also be brought about by means of a further control device on the drive vehicle in case of danger, e.g. if there is a failure of the drive vehicle service brake, even if the hydraulic press for depressing the driving wheels is pressure-loaded.

As a matter of course, the spring-loaded rail brake can be released or lifted by means of hydraulic pressure, if the hydraulic press for depressing the driving wheels is not loaded, through a corresponding control mechanism provided for the relocation operation of the complete material handling apparatus.

Finally, the precise movement of the drive vehicle and the complete material handling apparatus for relocation from aisleway to aisleway can be facilitated by means of a wheel-position indicator connected to the steered wheels of the drive vehicle.

Other objects and advantages will be apparent from the specification when taken in connection with the accompanying drawings, wherein:

FIG. 1 is a side elevation view of the material handling apparatus of the invention prior to commencing stacking and retrieving operation in an aisle;

FIG. 4 is a schematic view, shown partly in section, of a press and brake system adapted for use with the invention.

Figure 3:
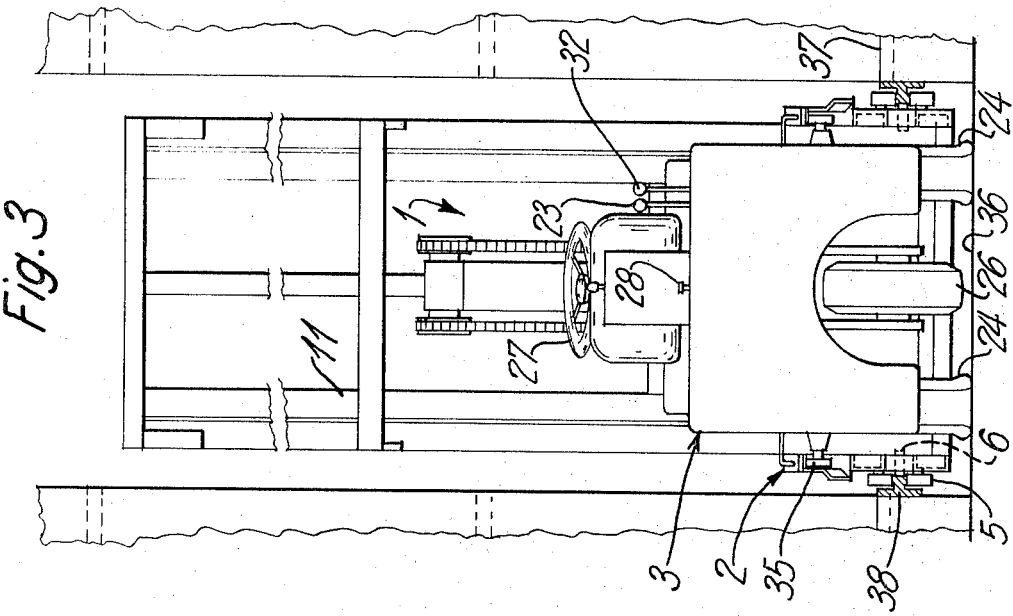
FIG. 3 is a rear elevation view of the apparatus as shown in FIG. 2.

Referring particularly to FIG. 1, the material handling apparatus is designated generally by the numeral 1, and comprises a traveling carriage 2 and a drive vehicle 3 capable of being passed into said traveling carriage.

The traveling carriage 2 comprises a frame 4 that is open in the rear and is provided on either side with four supporting rollers 5 and two guide rollers 6, an ascending guideway 7 and retainer 8, engageable with the drive vehicle 3, and a spring-loaded rail brake 9. A front wall 10 of the traveling carriage 2 is equipped with an upright assembly 11, the fork carriage assembly 12 of said upright assembly bearing a side loader, or shuttle assembly 13. The shuttle assembly 13 is of conventional design adapted to extend from both sides of the apparatus, and will not be discussed in detail. A mechanical coupling 14 extends rearwardly from the carriage 2 for attachment to the vehicle 3. An hydraulic press cylinder 16 is fastened to a bracket 15 and is connected to pressure chambers 18 (see FIG. 4) of the spring-loaded rail brakes 9 via lines 17 on either side of the frame 4. Additional couplings between the carriage 2 and drive vehicle 3 are attached on the rear side of front wall 10, namely an hydraulic coupling 19 for connecting a lift cylinder of the upright assembly 11, an hydraulic coupling 20 for connecting the hydraulic press 16 via line 42, and an electrical coupling 21 for generally known control devices designed for load handling such as the shuttle 13, that need not be described in more detail.

The drive vehicle 3, which can be an adaptation of a conventional towing vehicle or lift truck, preferably includes an electric front drive acting on the driving wheels 24 and is provided with a service brake 22 and a parking brake 23. A steered wheel 26 carried in bearings in the vehicle rear end 25 is connected to a manual steering assembly 27 and a wheel-position indicator 28. The drive vehicle 3 further contains a battery 29, a conventional hydraulic operating system connected by means of hydraulic coupling hoses 30 and 31 as well as a load-handling control 32 and, on its front side, features an electrical control-line connection 33. A coupling eye 34 is adapted to connect with coupler 14 on the carriage 2, while lateral run-in rollers 35 (see FIG. 3) and guide 7 are adapted to guide the drive vehicle into the carriage. Although a simple pin coupling 14 and 34 is shown, it can be appreciated that an automatic knuckle type coupler could be employed.

In each aisle two rails 38 with run-in portions 39 are fastened below shelf compartments 37 and are aligned relatively to the shelf line and approximately paralleling the floor 36, to guide the apparatus while it is operating in the aisle.

Figure 2:
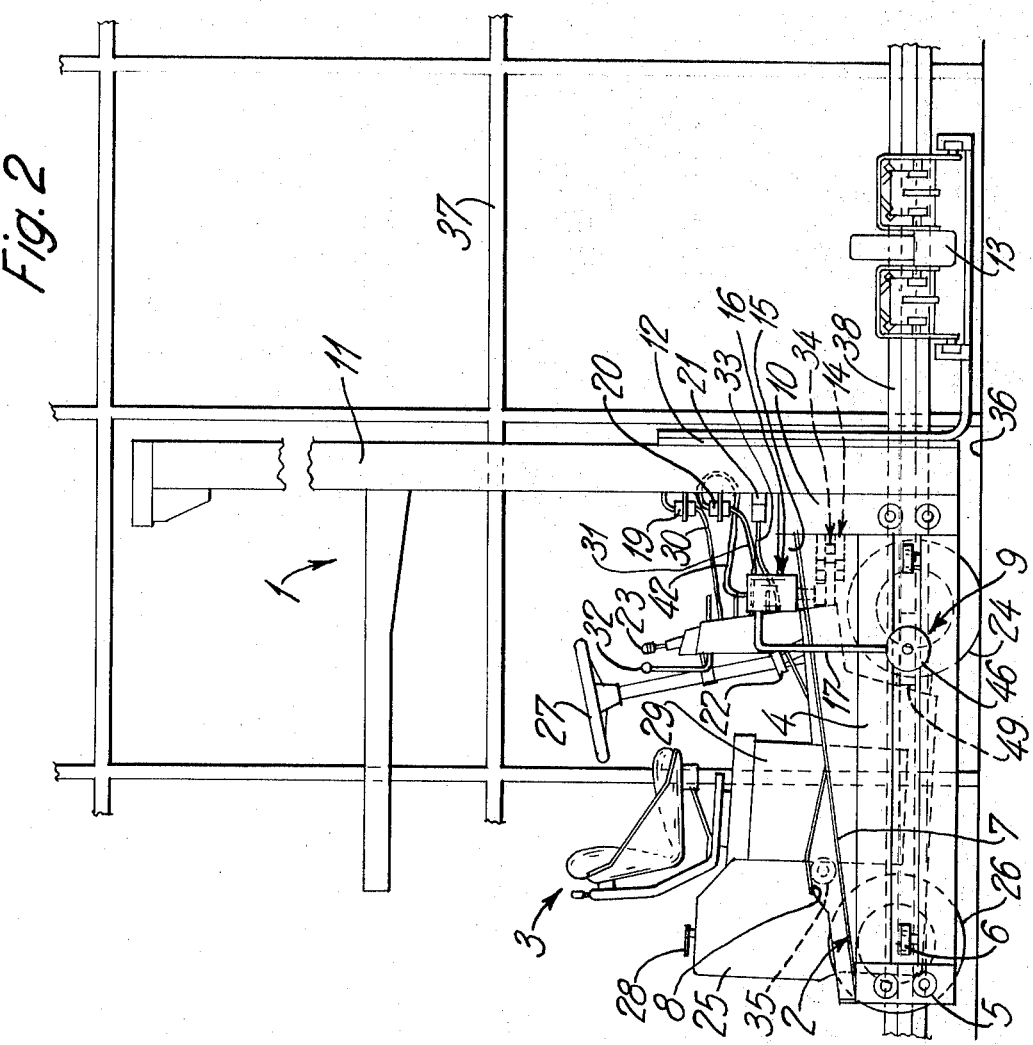
FIG. 2 is a side elevation view similar to FIG. 1, but showing the apparatus in operative position.

Referring again to FIG. 1, it is initially assumed that a traveling carriage 2 held by the rails 38 by means of its supporting rollers 5 and guide rollers 6 is located at the front end of the shelf aisleway, the spring-loaded rail brakes 9 of said traveling carriage securing this part of the unit in position with the hydraulic pressure chambers 18 now being relieved of pressure. As illustrated in FIGS. 2 and 3, the steerable drive vehicle 3 running on the floor is then moved into the open rear frame 4 of the traveling carriage 2 and the coupling eye 34 is connected to the mechanical coupling 14.

During the run-in operation, the rear end 25 of the drive vehicle 3 is lifted, together with the steered wheel 26, through the run-in rollers 35 supported by the ascending guideways 7 and secured against further vertical movement by the retainers 8, thus eliminating steering. The material handling apparatus 1 is ready for service after connection of the hydraulic coupling hose 30 to the hydraulic coupling 19 and of the hydraulic coupling hose 31 to the hydraulic coupling 20 as well as of the control line 33 to the electrical control line coupling 21.

Referring particularly to FIGS. 1 and 4, the hydraulic press 16 is fixed to the frame 4 of the traveling carriage 2 and, for purposes of illustration, is shown as a conventional hydraulic cylinder 40, including a ram 41, which can be spring-loaded to the retracted position. The press 16 is connected by means of line 42, to connector 20. Suitable controls of conventional design can be provided on the drive vehicle 3 for selectively pressurizing the press 16 and maintaining a constant pressure therein. When the drive vehicle and traveling carriage are coupled, as shown in FIG. 2, the ram 41 of cylinder 40 is engageable with a reinforced portion 43 of coupling eye 34. Thus, when cylinder 40 is pressurized a constant downward force substantially aligned with the front wheel axis is exerted on the front end of vehicle 3, ensuring a predetermined constant pressure of the drive wheels 24 onto the floor 36. It should be noted that sufficient vertical clearance is provided between the coupler 14 and coupling eye 34 to allow for some deflection of the vehicle 3 relative to the carriage 2 due to the actuation of press 16.

As previously described, the rail brakes 9, one of which is shown schematically in FIG. 4, are spring-loaded into engagement with the rails 38. In the illustrative embodiment shown, each brake 9, comprises a cylinder 46 attached to the frame 4 by any convenient means, a ram 47 movable within the cylinder, a spring 48 tending to force the ram 47 outward of the cylinder, and a brake block 49 attached to the end of ram 47 and normally in braking engagement with rail 38. The pressure chamber 18, formed ahead of the piston portion of ram 47 is connected to the pressure side of cylinder 40 by means of line 17.

When the hydraulic press 16 is pressurized to force the front end of vehicle 3 against the floor, the pressure in chamber 18 of cylinder 46 is increased sufficiently to overcome the braking force of spring 48, and the brake block 49 is disengaged from the rail 36 enabling the material handling apparatus to move freely in the aisle.

Besides securing the unit in position, which has already been mentioned, the spring-loaded rail brakes 9 of the traveling carriage 2 effect automatic emergency braking in case of a pressure drop in the hydraulic press 16 occasioned by a defect. Means (not shown) can also be provided to actuate the brakes intentionally in case of emergency.

For relocating the material handling apparatus 1 from aisleway to aisleway, first the steered wheel 26 is deposited on the floor 36 by returning the supporting rollers 5 and the guide rollers 6 beyond the run-in portions 39. Then, the entire unit is free from the rail guide after which it can be precisely maneuvered with the aid of the wheel-position indicator 28.

As a matter of course the invention is not restricted to the exemplified embodiment shown, but it can be modified in a variety of ways and can economically be adapted to various storage operations without departing from the system and the basic idea of the invention. Thus, for instance, the drive vehicle with operator's seat and manual steering assembly taken as a basis could be provided with partially fully automatic control systems by incorporation of devices known in themselves, the vehicle battery could be recharged on the shelf aisleway during downtimes of the unit via plugged-in contacts of a battery charger, or power could be exclusively supplied via sliding contact lines or trailing cables. Instead of the three-wheel drive vehicle illustrated, a four-wheel drive vehicle or one with front steered wheels and rear driving wheels or a machine running on the floor and provided with an hydraulic system could be employed. In particular, a lift truck that can be used for other load handling operations besides its application for the material handling apparatus of the present invention could be easily adapted for use herein.

I claim:

1. A material handling apparatus comprising a traveling carriage, load supporting means carried by said carriage, guide means mounted on said carriage and engageable with complemental guide means in a storage aisle for supporting and guiding said carriage in said aisle, a drive vehicle including at least one drive wheel and one steering wheel engageable with the floor, means selectively coupling said drive vehicle with said traveling carriage for movement within an aisle, and means mounted on said traveling carriage for applying a downward force acting between said complemental guide means and said at least one drive wheel whereby said downward force is independent of the load supported by said carriage.

2. Material handling apparatus as claimed in claim 1, including means mounted on said traveling carriage and engageable with said drive vehicle for lifting said at least one steering wheel free of floor engagement when said drive vehicle and traveling carriage are coupled.

3. Material handling apparatus as claimed in claim 1, including constant pressure means for applying said downward force to said at least one drive wheel.

4. Material handling apparatus as claimed in claim 1, in which said means for applying said downward force comprises a vertically oriented hydraulic cylinder including a ram member acting against a frame member of said drive vehicle.

5. Material handling apparatus as claimed in claim 1, in which said traveling carriage comprises spaced side frame members to which said guide means are attached, said spaced frame members defining a rearwardly opening channel through which said drive vehicle can pass for coupling engagement with said traveling carriage.

6. Material handling apparatus as claimed in claim 5, in which said spaced side frame members include ascending ramp means, and said drive vehicle includes guide means adjacent said at least one steering wheel and engageable with said ramp means, whereby said at least one steering wheel is raised free of ground engagement when said vehicle is passed between said spaced frame and into coupling engagement with said traveling carriage.

7. Material handling apparatus as claimed in claim 6, in which said ramp means includes retaining means engageable with said guide means on said drive vehicle and operable to inhibit vertical movement of said drive vehicle when said drive vehicle and said traveling carriage are in coupling engagement.

8. Material handling apparatus as claimed in claim 1, including brake means mounted on said traveling carriage and engageable with said complemental guide means.

9. Material handling apparatus as claimed in claim 8, in which said brake means are spring biased into braking engagement with said complemental guide means.

10. Material handling apparatus as claimed in claim 9, including means operatively associated with said means for applying a downward force to said at least one drive wheel to release said brake means when said downward force is applied.

11. Material handling apparatus as claimed in claim 4, including brake means normally spring biased into braking engagement with said complemental guide means, and hydraulic means operatively connected to said hydraulic cylinder and effective to overcome said spring bias to release said brake means when said cylinder is pressurized.

* * * * *